July 27, 1954  E. MANTZELL  2,684,938
DEVICE FOR MEASURING THE pH
Filed Dec. 22, 1950
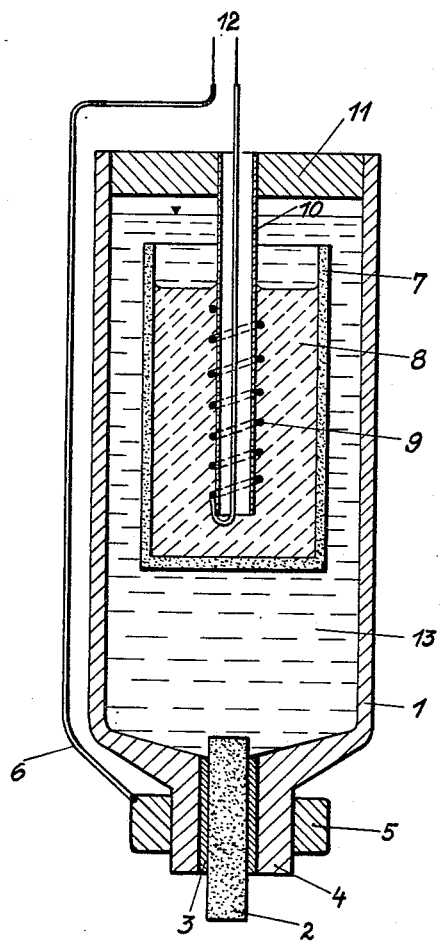
Inventor: ERNST MANTZELL
by
Attorney.

Patented July 27, 1954

2,684,938

UNITED STATES PATENT OFFICE 2,684,938

DEVICE FOR MEASURING THE pH

Ernst Mantzell, Vienna, Austria

Application December 22, 1950, Serial No. 202,160

Claim priority, application Austria
December 27, 1949

1 Claim. (Cl. 204—195)

This invention relates generally to a device for measuring the pH which, as is well known, is an index for the hydrogen ion concentration, and particularly relates to an improved reference electrode for such a device.

It is well known that the pH of a material, such as a liquid containing ions need not necessarily be measured with an expensive arrangement including a potentiometer but may also be determined directly by means of a voltmeter. In the latter case, however, care must be taken that the polarization of the liquid to be measured, which is caused by the current flow, does not become so large that the results are falsified. To this end it is essential that the measurements be made with particularly sensitive millivoltmeters having a high ohmic resistance so that even the maximum current corresponding to the full scale of the meter does not exceed 10 microamperes. Furthermore, it is essential to use antimony electrodes as the measuring electrodes which can be polarized only very little as well as to utilize measuring and reference electrodes having a sufficiently large surface. It is furthermore of the greatest importance to comply with all these conditions at the same time. For example, it is useless to utilize a very large antimony electrode unless the reference electrode also has a correspondingly large surface because an increase of the polarization at one place causes a disturbance of the entire system.

While the first two conditions may be satisfied without special difficulties, the problem of increasing the surface of the reference electrode has not been solved in a manner which is satisfactory in every respect. It is, of course, not difficult to provide sufficiently large calomel (mercurous chloride or HgCl) electrodes for measuring devices which are not movable and which permit a rapid and stable adjustment of the potential. However, the difficulties increase particularly when it is desired to provide a measuring device which is movable or which may be carried such, for example, as a handy device which may be dipped into the liquid to be measured. In such cases it has been suggested to utilize, instead of the liquid mercury of the electrode filling, amalgamated wire nets or meshes of platinum which are disposed vertically and are surrounded with calomel paste. However, even in this case it has been found that a strong polarization occurs which, after a few successive measurements, has the effect that the measured values decrease appreciably so that the values of the correct magnitude can only be obtained after a long interval of time. This effect may readily be explained in the following manner: The calomel electrodes consist conventionally of a cylindrical vessel of glass or other insulating material wherein the above described filling of calomel paste with its conductor or return connector of amalgamated platinum is disposed. This vessel, in turn, is disposed in a second vessel of glass or insulating material which is filled with a saturated potassium chloride solution, serving as the comparison electrolyte, and the contents of which are electrically connected with the solution to be measured in any suitable manner. The contact of the liquid of the inner vessel containing the actual reference electrode with the potassium chloride solution and thereby with the remainder of the system is effected by a stopper consisting of a material through which the liquid may penetrate and which is disposed in an opening of this vessel. It is a well known fact in the electro-chemical field that the electrical current flows essentially in such cases only toward those parts of the electrode which are adjacent to the point or area of entrance. Accordingly, the current density decreases toward the interior of the electrode and this decrease is the more rapid, the narrower the vessel.

In the present case this means that when the measuring circuit is closed through the millivoltmeter, the current flows preferably toward those parts of the platinum mesh which are adjacent to the entrance point of the calomel electrode so that the effective current density increases in those parts which is equivalent with an appreciable increase of the polarization. Accordingly, the intended effect of the increase of the electrode is largely illusory.

It is accordingly the principal object of the present invention to provide a device for measuring electrically the pH of a material such as a solution containing ions which avoids one or more of the disadvanatges of the prior art devices.

A further object of the invention is to provide an improved reference electrode for determining the pH of a solution which has an effective large surface thereby to prevent polarization thereof.

In accordance with the present invention the increase of the polarization caused by the prior art devices is completely eliminated by making not only the entrance of the reference electrode permeable for liquids but the entire wall of the electrode vessel. Thus the amalgamated platinum mesh which serves as the current connection is effective over its entire extent so that the polarization of the electrode is reduced to a minimum.

The electrode vessel may consist of ceramic materials, fritted glass, porous rubber as well as of any other material which is porous or permeable by a liquid such as paper or filter material provided the material has sufficient mechanical stability or resistance.

The invention is illustrated, by way of example, in the accompanying drawing showing schematically a longitudinal section of the pH measuring device of the invention.

Referring now to the drawing, there is illustrated a pH measuring device including the reference electrode of the invention and which may be dipped in the liquid to be measured. The device of the invention includes a housing 1 having a bottom in which there is disposed by means of a liquid packing a stopper 2 which is permeable by ions. The stopper 2 may, for example, consist of fritted glass. The antimony electrode 5 having a conductor 6 is fixed to the outer surface of the neck 4 of the vessel. The reference electrode which may, for example, be a calomel electrode, although the invention may, of course, also be applied to other electrodes of the type used for pH measurements, consists of a vessel 7 surrounding the electrode and consisting of a porous material which is permeable by ions as indicated above. The calomel paste 8 is contained in vessel 7. The platinum return connection 9 is supported by a glass tube 10 which, in turn, is suspended from the cover 11 of the vessel 1. The measuring instrument is connected to the terminals 12. The potassium chloride solution which serves as the comparison electrolyte is indicated at 13.

The electrode arrangement in accordance with the invention has other considerable advantages over the prior art devices; thus, the device of the invention is break-proof and forms a closed vessel so that it may be used in any desired position without the danger of spilling the contents of the electrode. However, one of the most important advantages is that the disproportioning of the contents of the vessel, which normally occurs when calomel electrodes are used and which causes severe changes of the potential, is largely avoided because the content of the electrode is accessible from all sides to the saturated potassium chloride solution so that any differences of the concentration may be continuously balanced.

A calomel electrode manufactured in accordance with the invention and having outer dimensions of 15 by 60 millimeters has shown surprising results. Up to ten measurements per minute could be performed in solutions having different pH values by measuring directly the voltage without reducing the reproducibility of the values within the limits of the measuring accuracy which is between 0.1 and 0.2 pH for an antimony electrode.

In view of its small dimensions, its great resistance against breakage and its chemical stability the electrode of the invention may find use particularly in portable devices which may be dipped into the liquid to be measured and where the pH may be directly indicated and which, in view of their simple operation, are more suited for continuous measurements in factories than the conventional devices which utilize compensation means.

Since certain changes may be made in the above device and different embodiments of the invention could be made without departing from the scope thereof, it is intended that all matter contained in the above description or shown in the accompanying drawing, shall be interpreted as illustrative and not in a limiting sense.

Having thus described the invention, what I claim as new and desire to be secured by Letters Patent, is as follows:

A calomel reference electrode or half cell for measuring the pH of an ion-containing liquid and comprising a substantially cylindrical vessel having a wall consisting entirely of a material permeable by ions, a tube of insulating material disposed centrally in said vessel, a metallic conductor disposed spirally about said tube to provide a large effective surface, calomel paste disposed in the space between said tube and said vessel, whereby an electrolyte serving as a liquid bridge and surrounding the outer surface of said vessel is in uniform contact with said calomel paste and with said conductor to provide for a substantially constant current density through the reference electrode during its operation, said permeable wall portion being at least co-extensive with the entire effective surface of said metallic return conductor, said return conductor being surrounded for every cross-section of said vessel by said paste and by said permeable wall portion.

References Cited in the file of this patent

UNITED STATES PATENTS

| Number | Name | Date |
|---|---|---|
| 2,190,835 | Gruss et al. | Feb. 20, 1940 |
| 2,338,713 | Ewing | Jan. 11, 1944 |

FOREIGN PATENTS

| Number | Country | Date |
|---|---|---|
| 733,630 | Germany | Mar. 31, 1943 |